(12) United States Patent
Ohya et al.

(10) Patent No.: US 7,011,252 B2
(45) Date of Patent: Mar. 14, 2006

(54) IC CARD AND OS ACTIVATION METHOD FOR THE SAME

(75) Inventors: Mitsuyoshi Ohya, Osaka (JP); Tatsumi Sumi, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 173 days.

(21) Appl. No.: 10/821,979

(22) Filed: Apr. 12, 2004

(65) Prior Publication Data
US 2004/0200903 A1    Oct. 14, 2004

(30) Foreign Application Priority Data
Apr. 14, 2003    (JP) .............................. 2003-108882

(51) Int. Cl.
*G06K 19/06*    (2006.01)
*G06K 5/00*    (2006.01)

(52) U.S. Cl. ...................................... 235/492; 235/380
(58) Field of Classification Search ............... 235/441, 235/451
See application file for complete search history.

(56) References Cited

U.S. PATENT DOCUMENTS

| | | | | |
|---|---|---|---|---|
| 6,164,549 A | * | 12/2000 | Richards | ............. 235/492 |
| 6,375,082 B1 | | 4/2002 | Kobayashi et al. | |
| 6,669,487 B1 | * | 12/2003 | Nishizawa et al. | ............. 439/60 |
| 6,834,799 B1 | * | 12/2004 | Tanabiki et al. | ............. 235/382 |
| 2004/0164170 A1 | * | 8/2004 | Krygier et al. | ............. 235/492 |

FOREIGN PATENT DOCUMENTS

| | | |
|---|---|---|
| CN | 1231459 A | 10/1999 |
| CN | 1460965 A | 12/2003 |
| CN | 1512435 A | 7/2004 |
| EP | 1 367 532 A | 12/2003 |
| JP | 2000-172806 A | 6/2000 |
| JP | 2002-366914 A * | 12/2002 |
| JP | 2002-373317 A * | 12/2002 |
| JP | 2003-076954 A | 3/2003 |

* cited by examiner

*Primary Examiner*—Jared J. Fureman
(74) *Attorney, Agent, or Firm*—McDermott Will & Emery LLP

(57) ABSTRACT

In an IC card applicable to a plurality of data transfer methods and including a plurality of OSs, when power sufficient for the operation is supplied to the IC card, an initial OS selecting section activates one of the plural OSs as an initial OS on the basis of identification information stored in a nonvolatile memory. A transfer method determining section determines a data transfer method on the basis of data received from a reader/writer. An OS applicability determining section determines whether or not the determined data transfer method accords with a data transfer method corresponding to the currently employed OS. When the data transfer methods do not accord with each other, an OS switching section switches the currently employed OS to another OS.

18 Claims, 9 Drawing Sheets

IC CARD AND OS ACTIVATION METHOD FOR THE SAME

BACKGROUND OF THE INVENTION

The present invention relates to an IC card, and more particularly, it relates to a technique to control OS activation suitable to an IC card applicable to a plurality of data transfer methods and including a plurality of operating systems (OSs), and in particular, suitable to a contactless IC card.

IC cards composed of IC chips having nonvolatile memories have recently been widely spread as electric money, ID cards, commuting tickets and phonecards. This type of IC cards employ, depending upon their use environments and systems, various data transfer methods and management methods for data in their memories different in accordance with their intended uses. Therefore, a user should use IC cards according to the standards necessary for the respective uses and hence should unavoidably possess a plurality of IC cards.

In order to solve this problem, a conventional technique in which data demodulating means corresponding to a plurality of data transfer methods are provided in an IC chip built in one IC card so as to select an appropriate demodulated signal by using a selector has been proposed (for example, see Japanese Laid-Open Patent Publication No. 2000-172806 (pp. 2–5 and FIG. 4)). In this conventional technique, one IC card can cope with the Type A method and the Type B method defined by the international standards such as ISO/IEC14443-2, and can precisely process data in response to a modulated signal of either type.

The data transfer methods dealt with by the aforementioned IC card are both based on the common standards, and therefore, files stored in a memory included in the IC card can be managed by using a common OS. In the case where the files stored in the memory are managed by different methods depending upon the data transfer methods, however, the file management cannot be performed by using one OS. Therefore, it is difficult to execute data processing in accordance with different standards in one IC card.

In order to solve this problem, a conventional technique in which a plurality of OSs are included in one IC card so as to activate an appropriate OS identified on the basis of information about an IC card OS included in a command received from an external device has been proposed (for example, see Japanese Laid-Open Patent Publication No. 2003-76954 (pp. 6–7 and FIG. 8)). In this conventional technique, one IC card is applicable to a plurality of OSs (IC card OSs), resulting in realizing what is called a multi-OS IC card.

Although the latter IC card includes a plurality of OSs, it has a problem of slow response to an initial command because an appropriate OS is not found until the initial command is received from an external device. This problem is serious particularly when a sufficient time is necessary for activating an OS. For example, when this IC card is applied to a commuting ticket, it is necessary to complete various data processing through data transfer between the IC card and an automatic ticket gate before a user passes through the ticket gate. However, if the response to an initial command received from the automatic ticket gate is slow, the necessary data processing cannot be completed before the user passes through the automatic ticket gate, and therefore, there may arise a problem that the user cannot pass through the ticket gate.

Furthermore, according to, for example, ISO/IEC14443-3, a time taken by an IC card from receipt of a command to sending of a response is previously defined. Therefore, in the method where an appropriate OS is found after receiving a command, since a time for activating the OS is additionally necessary, a response may not be sent within the defined time.

For the purpose of solving these problems, it can be considered that the time required for activating an OS is reduced by accelerating an operation clock of an LSI built in an IC card. However, the acceleration of the operation clock is not preferred because it may increase power consumption. In particular, power supply is limited in a contactless IC card, and therefore, there arises another problem that a sufficient communication distance performance cannot be exhibited when the power consumption is increased by accelerating the operation clock.

SUMMARY OF THE INVENTION

In consideration of the aforementioned conventional problems, an object of the invention is, in an IC card applicable to a plurality of data transfer methods and including a plurality of OSs respectively corresponding to the plural data transfer methods, quickly selecting and activating an OS appropriate to each data transfer method without accelerating an operation clock.

In order to achieve the object, according to the present invention, the IC card capable of sending/receiving data by a plurality of data transfer methods and including a plurality of OSs respectively corresponding to the plurality of data transfer methods, includes transfer method determining means for determining, on the basis of externally received data, which of the plurality of data transfer methods is employed for data transfer with an external device; OS applicability determining means for determining whether or not a first data transfer method corresponding to a currently employed OS out of the plurality of data transfer methods accords with a second data transfer method determined by the transfer method determining means; and OS switching means for switching the currently employed OS to another OS out of the plurality of OSs when the OS applicability determining means determines that the first data transfer method does not accord with the second data transfer method, and one of the plurality of OSs is activated when power is supplied.

According to this invention, when power is supplied to the IC card, one of the plurality of OSs included in the IC card is activated. Furthermore, the transfer method determining means determines which data transfer method is employed for the externally received data, and the OS applicability determining means determines whether or not the currently employed OS is applicable, so that the currently employed OS can be switched to another OS when the currently employed OS is not applicable. In this manner, an IC card OS is activated more quickly without accelerating a clock of the IC card than in the case where an optimum OS is selected after receiving data.

Preferably, the IC card of this invention further includes a storage circuit for storing static information for use in selecting an initial OS to be activated when power is supplied to the IC card; and initial OS selecting means for selecting the initial OS from the plurality of OSs on the basis of the static information stored in the storage circuit, and the initial OS selected by the initial OS selecting means is activated when power is supplied.

Thus, a more appropriate initial OS is selected and activated at the start of the operation of the IC card on the basis of the static information for use in selecting the initial OS.

Preferably, the storage circuit stores the plurality of OSs.

More specifically, the storage circuit stores, as the static information, information about response times demanded for in the plurality of data transfer methods respectively corresponding to the plurality of OSs, and the initial OS selecting means selects, as the initial OS, one of the plurality of OSs corresponding to a data transfer method in which the demanded response time is relatively short.

Alternatively, the storage circuit stores, as the static information, information about response times actually necessary in the plurality of data transfer methods respectively corresponding to the plurality of OSs, and the initial OS selecting means selects, as the initial OS, one of the plurality of OSs corresponding to a data transfer method in which the actually necessary response time is relatively long.

Alternatively, the storage circuit stores, as the static information, information about shifts between demanded response times and actually necessary response times in the plurality of transfer methods respectively corresponding to the plurality of OSs, and the initial OS selecting means selects, as the initial OS, one of the plurality of OSs corresponding to a data transfer method in which the shift is relatively large with the actually necessary response time longer than the demanded response time.

Preferably, each of the response times is a response time to an initial command involved in data transfer between the IC card and the external device.

Alternatively, the storage circuit stores, as the static information, information about times respectively necessary for activating the plurality of OSs, and the initial OS selecting means selects, as the initial OS, one of the plurality of OSs that needs a relatively long time for activation.

Preferably, the IC card of this invention further includes a storage circuit for storing dynamic information for use in selecting an initial OS to be activated when power is supplied to the IC card; initial OS selecting means for selecting the initial OS from the plurality of OSs on the basis of the dynamic information stored in the storage circuit; and information updating means for updating the dynamic information stored in the storage circuit, and the initial OS selected by the initial OS selecting means is activated when power is supplied.

In this manner, the dynamic information for use in selecting the initial OS is appropriately updated, so as to realize an IC card capable of OS activation processing according to the actual use condition of the IC card by a user.

More specifically, the storage circuit stores, as the dynamic information, information about activation frequencies of the plurality of OSs, and the initial OS selecting means selects, as the initial OS, one of the plurality of OSs whose activation frequency is large.

Alternatively, the storage circuit stores, as the dynamic information, information about activation histories of the plurality of OSs, and the initial OS selecting means selects, as the initial OS, one of the plurality of OSs that has been activated immediately previously.

Preferably, the storage circuit is a rewritable nonvolatile memory.

On the other hand, in order to achieve the object, the OS activation method of this invention for an IC card capable of sending/receiving data by a plurality of data transfer methods and including a plurality of OSs respectively corresponding to the plurality of data transfer methods, includes an OS activating step of activating one of the plurality of OSs when power is supplied to the IC card; a transfer method determining step of determining, on the basis of an externally received data, which of the plurality of transfer methods is employed for data transfer with an external device; an OS applicability determining step of determining whether or not a first data transfer method out of the plurality of data transfer methods corresponding to the OS activated in the OS activating step accords with a second data transfer method determined in the transfer method determining step; and an OS switching step of switching the OS activated in the OS activating step to another OS out of the plurality of OSs when it is determined that the first data transfer method does not accord with the second data transfer method in the OS applicability determining step.

According to this invention, when power is supplied to the IC card, one of the plurality of OSs included in the IC card is activated. Furthermore, it is determined which data transfer method is employed for externally receiving data, and applicability of the currently employed OS is determined. When the currently employed OS is not applicable, it is switched to another OS. Thus, an IC card OS is activated more quickly without accelerating a clock of the IC card than in the case where an optimum OS is selected after receiving data.

Preferably, when power is supplied to the IC card, an initial OS to be activated in response to power supply to the IC card is selected from the plurality of OSs on the basis of static information for use in selecting the initial OS and the selected initial OS is activated in the OS activating step.

Preferably, when power is supplied to the IC card, an initial OS to be activated in response to power supply to the IC card is selected from the plurality of OSs on the basis of dynamic information for use in selecting the initial OS and the selected initial OS is activated in the OS activating step, and the OS activation method further includes an information updating step of updating the dynamic information.

DETAILED DESCRIPTION OF THE INVENTION

Preferred embodiments of the invention will now be described with reference to the accompanying drawings.

Embodiment 1

Figure 1:
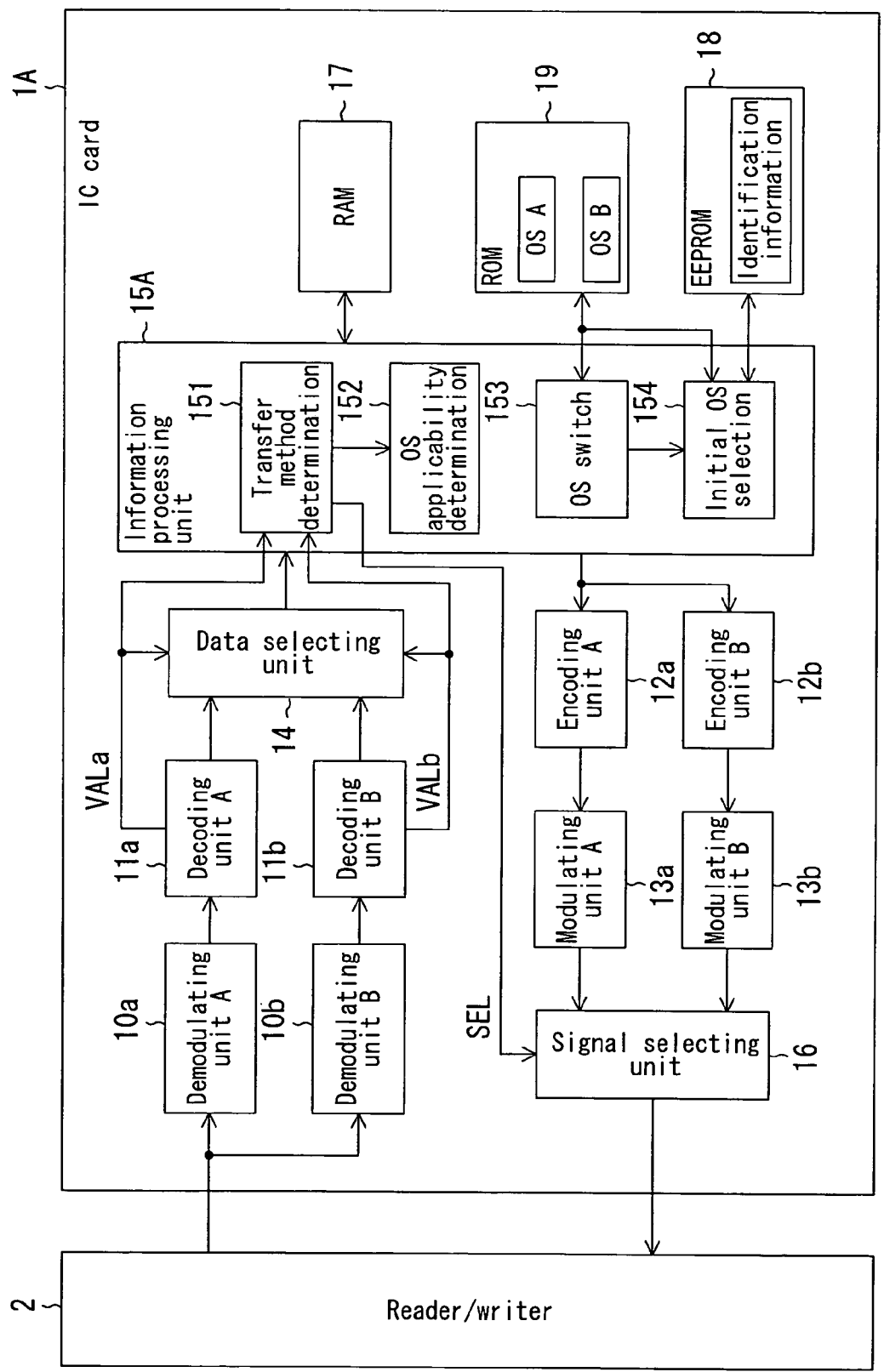
FIG. 1 is a functional block diagram of an IC card system composed of an IC card according to Embodiment 1 of the invention and an external device.

FIG. 1 is a functional block diagram of an IC card system composed of an IC card according to Embodiment 1 of the invention and an external device. In the IC card system shown in FIG. 1, data are sent/received between the IC card 1A and a reader/writer 2 corresponding to the external device for writing data in and reading data from the IC card 1A.

The IC card 1A of this embodiment has a structure applicable to different two kinds of data transfer methods. Specifically, the IC card 1A includes a demodulating unit 10a, a decoding unit 11a, an encoding unit 12a and a modulating unit 13a as data sending/receiving means for realizing a data transfer method A, and includes a demodulating unit 10b, a decoding unit 11b, an encoding unit 12b and a modulating unit 13b as data sending/receiving means for realizing a data transfer method B.

Each of the demodulating units 10a and 10b demodulates modulated data received by the IC card 1A from the reader/writer 2 by a corresponding demodulating method. Then, each of the decoding units 11a and 11b decodes the data having been demodulated by the demodulating unit 10a or 10b by a corresponding decoding method.

Also, each of the decoding units 11a and 11b determines, on the basis of a code or a synchronization detection code obtained in the decoding, whether or not the decoded data accords with and is effective for the employed decoding method and data transfer method, and outputs a determination signal VALa or VALb corresponding to the determination result. A data selecting unit 14 selects, on the basis of the determination signals VALa and VALb, effective data out of the decoded data output from the decoding units 11a and 11b, and outputs the selected data to an information processing unit 15A.

The information processing unit 15A executes processing specified by command packet data received from the reader/writer 2 and creates response packet data to be sent to the reader/writer 2. At this point, the information processing unit 15A appropriately makes accesses to a volatile memory 17 such as a RAM (Random Access Memory) for storing temporal operation information and a nonvolatile memory 18 such as an EEPROM (Electrically Erasable Programmable ROM) or a FeRAM (Ferroelectric RAM) for storing user data to be read/written. The information processing unit 15A can be constructed by using, for example, a CPU.

Each of the encoding units 12a and 12b encodes data supplied by the information processing unit 15A by a corresponding encoding method. Each of the modulating units 13a and 13b modulates the data having been encoded by the encoding unit 12a or 12b by a corresponding modulating method. A signal selecting unit 16 selects, on the basis of a selection signal SEL supplied from the information processing unit 15A, one of the signals having been respectively modulated by the modulating units 13a and 13b and sends the selected signal to the reader/writer 2. The selection signal SEL will be described in detail later.

The IC card 1A of this embodiment includes two kinds of OSs (Operating Systems) for respectively realizing different file management methods. Specifically, an OS A and an OS B for realizing file management methods corresponding to the data transfer methods A and B, respectively are stored in a ROM (Read Only Memory) 19. One of the OS A and the OS B corresponding to the data transfer method and the standards involved in the data transfer performed between the IC card 1A and the reader/writer 2 is selected and activated as an OS for the IC card 1A.

In this manner, the IC card 1A of this embodiment is applicable not only to standards A employing the data transfer method A and the file management method using the OS A but also to standards B employing the data transfer method B and the file management method using the OS B.

Next, the architecture of a portion of the information processing unit 15A involved in OS activation control will be described in detail.

The information processing unit 15A includes a transfer method determination module 151, an OS applicability determination module 152, an OS switch module 153 and an initial OS selection module 154. Each of these modules can be executed by using hardware or through program processing.

The initial OS selection module 154 selects, on the basis of identification information stored in the nonvolatile memory 18, an initial OS to be first activated from the OS A and the OS B stored in the ROM 19. At this point, the identification information means information about selection of the initial OS to be activated when power is supplied to the IC card 1A. Specific examples of the identification information will be described later. The initial OS thus selected by the initial OS selection module 154 is activated at the start of the operation after power sufficient for the operation is supplied.

The transfer method determination module 151 determines, on the basis of received data from the reader/writer 2, which of the data transfer method A and the data transfer method B is employed for data transfer between the IC card 1A and the reader/writer 2. Specifically, it determines an effective data transfer method on the basis of the determination signals VALa and VALb respectively output by the decoding units 11a and 11b. Also, the transfer method determination module 151 outputs the selection signal SEL corresponding to the effective data transfer method to the signal selecting unit 16. The signal selecting unit 16 selects a modulated signal to be sent to the reader/writer 2 on the basis of the selection signal SEL as described above.

The OS applicability determination module 152 determines whether or not the effective data transfer method determined by the transfer method determination module 151 accords with the data transfer method corresponding to the currently employed OS.

The OS switch module 153 switches the currently employed OS to the other OS when the OS applicability determination module 152 determines that the data transfer method corresponding to the currently employed OS does not accord with the effective data transfer method determined by the transfer method determination module 151.

Next, OS activation processing performed in the IC card 1A of this embodiment will be described with reference to a flowchart of FIG. 2.

First, when power sufficient for the operation is supplied to the IC card 1A, the IC card 1A starts the operation (in step S11), and initial processing is performed and the identification information is read from the nonvolatile memory 18 (in step S12). Then, the initial OS is selected on the basis of the read identification information (in step S13). In this embodiment, the processing of step S13 is executed by the initial OS selection module 154. Specific examples of the initial OS selection processing will be described later.

In the case where the OS A is selected as the initial OS as a result of the initial OS selection processing performed in step S13, the OS A is read from the ROM 19 and activated (in step S14a), and the IC card 1A enters the command wait state. Thereafter, on the basis of the result of the decoding processing of a command that is first received from the reader/writer 2 after the start of the operation of the IC card 1A (namely, an initial command), the effective data transfer method is determined (in step S15a). In this embodiment, the processing of step S15a is executed by the transfer method determination module 151.

In the case where the effective transfer method determined as a result of the execution of the processing of step S15a does not correspond to the currently employed OS A but corresponds to the OS B (namely, NO in step S116a), the OS B is read from the ROM 19 and newly activated as the OS for the IC card 1A (in step S17a). After activating the OS B, if command analysis processing cannot be continuously executed, the IC card 1A enters the wait state for a next command. Since the command is generally resent again, the command analysis processing is executed after receiving the resent command. On the other hand, when the determined effective data transfer method corresponds to the currently employed OS A (namely, YES in step S16a), the command analysis processing of the received command is continued (in step S19). In this embodiment, the processing of step S16a and step S17a are respectively executed by the OS applicability determination module 152 and the OS switch module 153.

On the other hand, in the case where the OS B is selected as the initial OS as a result of the initial OS selection processing executed in step S13, the OS B is activated (in step S14b), the effective data transfer method is determined on the basis of the initial command (in step S15b), the applicability of the currently employed OS B is determined (in step S16b), and the command analysis processing is executed (in step S19) similarly to the above. Needless to say, in the case where it is determined that the OS B is not applicable (namely, NO in step S16b), the OS A is newly activated (in step S17b), and the command analysis processing is executed (in step S19).

Next, the selection of the initial OS in the IC card 1A of this embodiment will be explained by describing some specific examples.

FIRST EXAMPLE OF INITIAL OS SELECTION

In the first example of the initial OS selection, information about response times demanded for by the standards in the data transfer methods respectively corresponding to the OS A and the OS B are used as the identification information. Herein, a response time means a send/receive time taken by the IC card 1A from receipt of command packet data to sending of response packet data.

This identification information can be any data based on which the priority of the activation of the OS A and the OS B can be determined. For example, the identification information may be absolute time information or relative order information between the OS A and the OS B based on the lengths of the demanded response times. The demanded response time is peculiar information previously defined by the standards. Accordingly, the identification information can be written in the nonvolatile memory 18 during the fabrication of the IC card.

Figure 2:
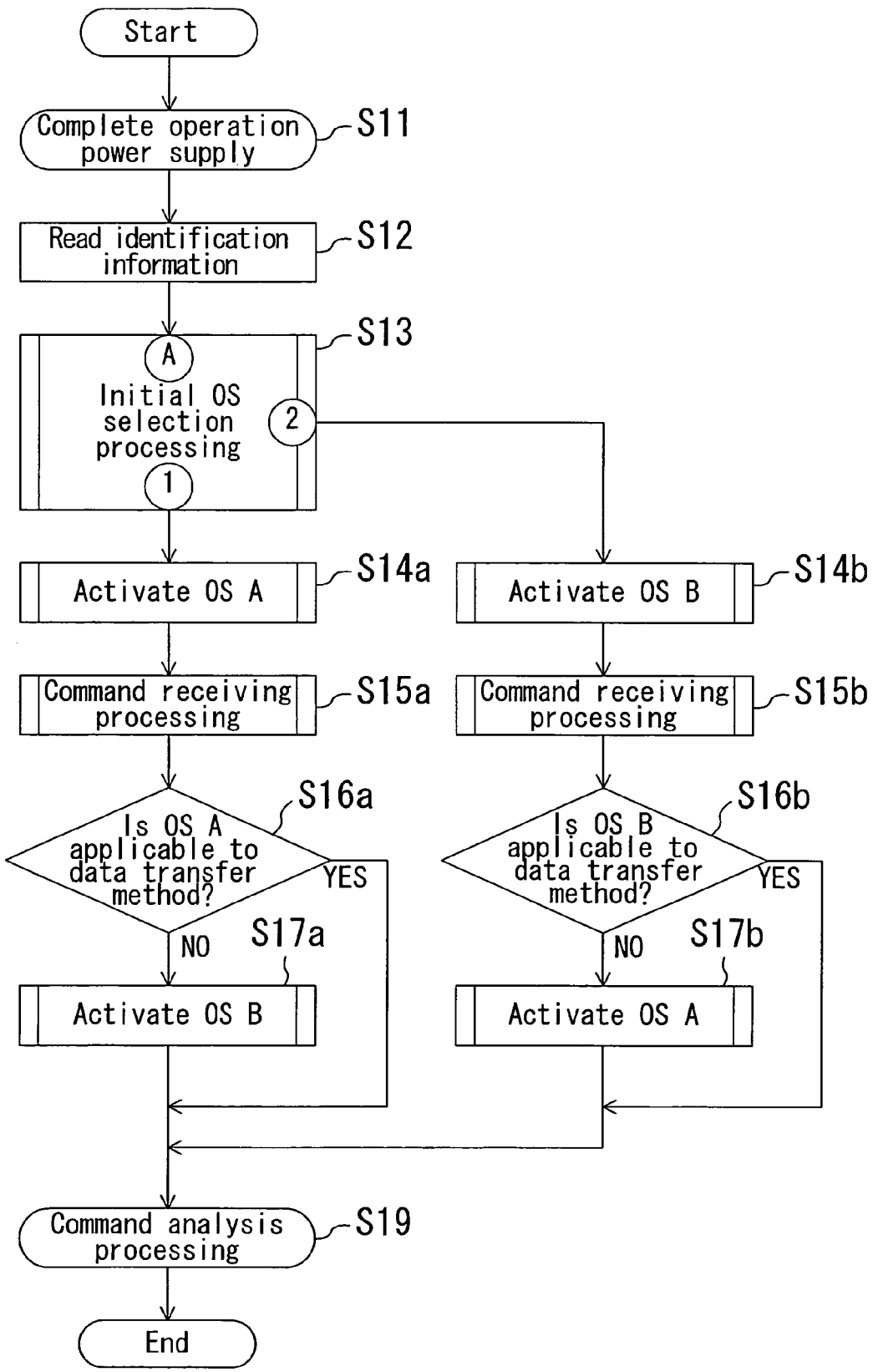
FIG. 2 is a flowchart of OS activation processing performed by the IC card of Embodiment 1 of the invention.
Figure 3:
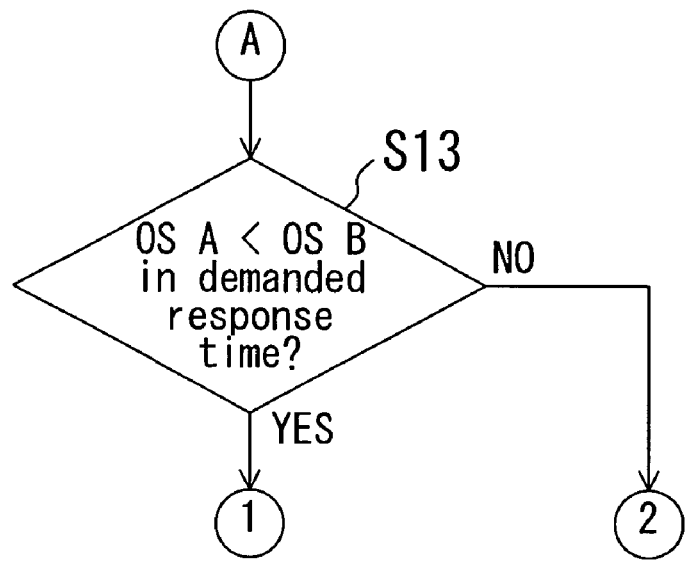
FIG. 3 is a chart of a first specific example of initial OS selection processing of FIG. 2.

FIG. 3 shows the initial OS selection processing (performed in step S13) of FIG. 2 corresponding to this example. In step S13, the demanded response times of the OS A and the OS B are relatively compared with each other. When the demanded response time of the OS A is determined to be shorter (namely, YES in step S13), the OS A is activated, and when the demanded response time of the OS B is determined to be shorter (namely, NO in step S13), the OS B is activated. In other words, an OS corresponding to a data transfer method in which the demanded response time is shorter, namely, an OS that should respond to a received command more quickly, is selected and activated priorly. Thus, the response processing is completed within the response time defined by the standards.

SECOND EXAMPLE OF INITIAL OS SELECTION

In the second example of the initial OS selection, information about response times actually necessary in the data transfer methods respectively corresponding to the OS A and the OS B are used as the identification information. This identification information can be any data based on which the priority of the activation of the OS A and the OS B can be determined. For example, the identification information may be absolute time information or relative order information between the OS A and the OS B based on the lengths of the actually necessary response times. Alternatively, it may be information about a response time necessary when there is no need to activate another OS because an OS initially activated after the operation start of the IC card 1A corresponds to a data transfer method of a received command, or information about a response time necessary when another OS should be activated because an OS initially activated does not correspond to a received command. The actually necessary response time is peculiar information uniquely determined based on the kind of OS to be employed or the architecture of a send/receive circuit. Accordingly, the identification information can be written in the nonvolatile memory 18 during the fabrication of the IC card.

Figure 4:
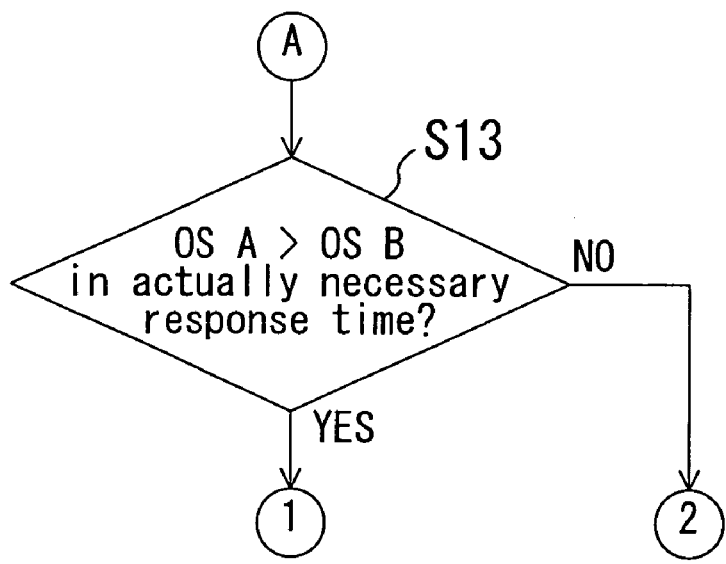
FIG. 4 is a chart of a second specific example of the initial OS selection processing of FIG. 2.

FIG. 4 shows the initial OS selection processing (performed in step S13) of FIG. 2 corresponding to this example. In step S13, the actually necessary response times of the OS A and the OS B are relatively compared with each other. When the actually necessary response time of the OS A is determined to be longer (namely, YES in step S13), the OS A is activated, and when the actually necessary response time of the OS B is determined to be longer (namely, NO in step S13), the OS B is activated. In other words, an OS corresponding to a data transfer method in which the actually necessary response time is longer, namely, an OS that takes a longer time to perform the response processing, is selected and activated priorly. Thus, the maximum response time to an initial command is reduced than in a conventional method.

THIRD EXAMPLE OF INITIAL OS SELECTION

In the third example of the initial OS selection, information about a "shift" between the demanded response time and the actually necessary response time of each of the data transfer methods corresponding to the OS A and the OS B is used as the identification information.

This "shift" corresponds to a margin degree indicating how much margin is between the demanded response time and the actually necessary response time. Specifically, the actually necessary response time being shorter than the demanded response time means that there is a margin against the standard value, namely, the margin degree is relatively large. In this case, the "shift" is a negative value when it is indicated by, for example, an absolute time value. On the contrary, the actually necessary response time being longer than the demanded response time means that there is no margin against the standard value, namely, the margin degree is relatively small. In this case, the "shift" is a positive value when it is indicated by, for example, an absolute time value. Accordingly, in this case, as the value corresponding to the "shift" is larger, the margin degree against the standard value is smaller.

This identification information can be any data based on which the priority of the activation of the OS A and the OS B can be determined. The identification information may be an absolute value as described above or relative order information between the OS A and the OS B based on the magnitudes of the "shifts". The information about the "shift" can be obtained on the basis of peculiar information defined by the standards and peculiar information uniquely determined based on the kind of OS to be employed and the architecture of a receive/send circuit. Accordingly, the identification information can be written in the nonvolatile memory 18 during the fabrication of the IC card. Also, in the case where the demanded response time is changed in actual use, the identification information resulting from the change is stored in the memory.

Figure 5:
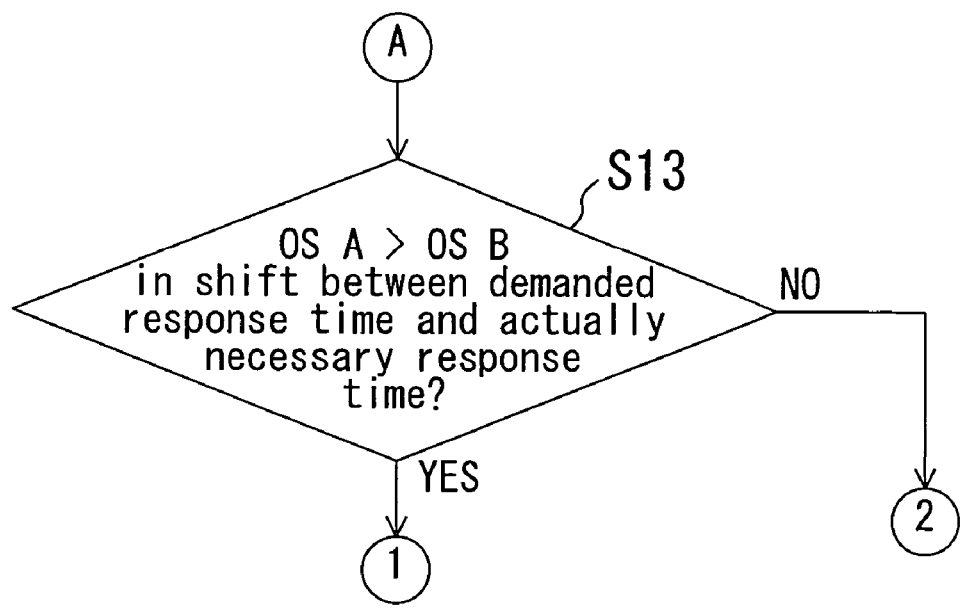
FIG. 5 is a chart of a third specific example of the initial OS selection processing of FIG. 2.

FIG. 5 shows the initial OS selection processing (performed in step S13) of FIG. 2 corresponding to this example. In step S13, the magnitudes of the "shifts" between the demanded response times and the actually necessary response times of the OS A and the OS B are relatively compared with each other. When the "shift" of the OS A is determined to be larger (namely, YES in step S13), the OS A is activated, and when the "shift" of the OS B is determined to be larger (namely, NO in step S13), the OS B is activated. In other words, an OS corresponding to a data transfer method with a larger "shift", namely, an OS with a smaller margin degree, is selected and activated priorly. Thus, the response processing is completed within the response time defined by the standards.

FOURTH EXAMPLE OF INITIAL OS SELECTION

In the fourth example of the initial OS selection, information about times required for activating the OS A and the OS B are used as the identification information. This identification information can be any data based on which the priority of the activation of the OS A and the OS B can be determined. The identification information may be, for example, absolute time information or relative order information between the OS A and the OS B based on the lengths of the OS activation times. The OS activation time is peculiar information previously determined with respect to the kind of OS, and therefore, the identification information can be written in the nonvolatile memory 18 during the fabrication of the IC card.

Figure 6:
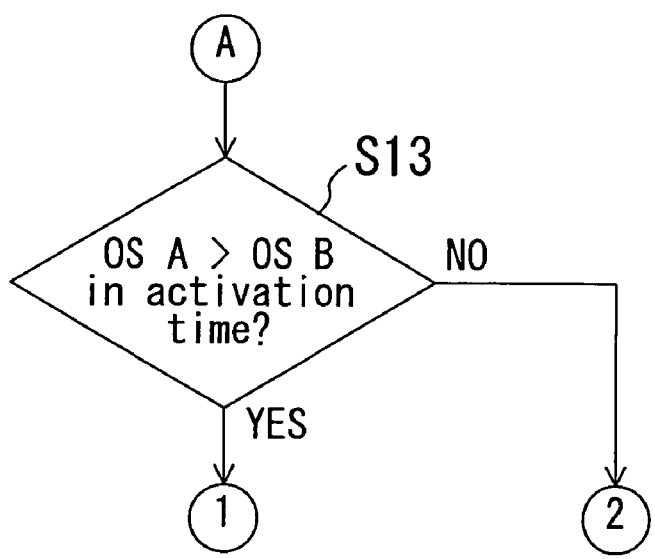
FIG. 6 is a chart of a fourth specific example of the initial OS selection processing of FIG. 2.

FIG. 6 shows the initial OS selection processing (performed in step S13) of FIG. 2 corresponding to this example. In step S13, it is determined which activation time of the OS A or the OS B is longer. When the activation time of the OS A is determined to be longer (namely, YES in step S13), the OS A is activated, and when the activation time of the OS B is determined to be longer (namely, NO in step S13), the OS B is activated. In other words, an OS with a longer activation time is selected and activated priorly. Thus, time spent from the supply of the power to the IC card 1A to the start of the operation of an OS with a longer activation time is reduced than in a conventional method, and the maximum response time to an initial command is reduced than in the conventional method.

As described so far, according to this embodiment, when the power is supplied and the IC card 1A starts its operation, one of the OS A and the OS B is activated as the initial OS. Therefore, as compared with the conventional method in which it cannot be determined which OS is to be activated at the time of the power supply to the IC card and an appropriate OS is selected and activated after receiving an initial command from the reader/writer 2, the response processing to an initial command is more quickly executed. Also, when various selection information are used for selecting the initial OS, the initial OS is more appropriately selected.

The identification information is stored in the nonvolatile memory 18 in this embodiment, which does not limit the invention. The identification information may be stored in the ROM 19 together with the OS A and the OS B. Thus, the identification information can be stored in the ROM 19 at the same time as the OSs during OS registration in the IC card 1A, and therefore, the efficiency of the whole system is improved.

Embodiment 2

Figure 7:
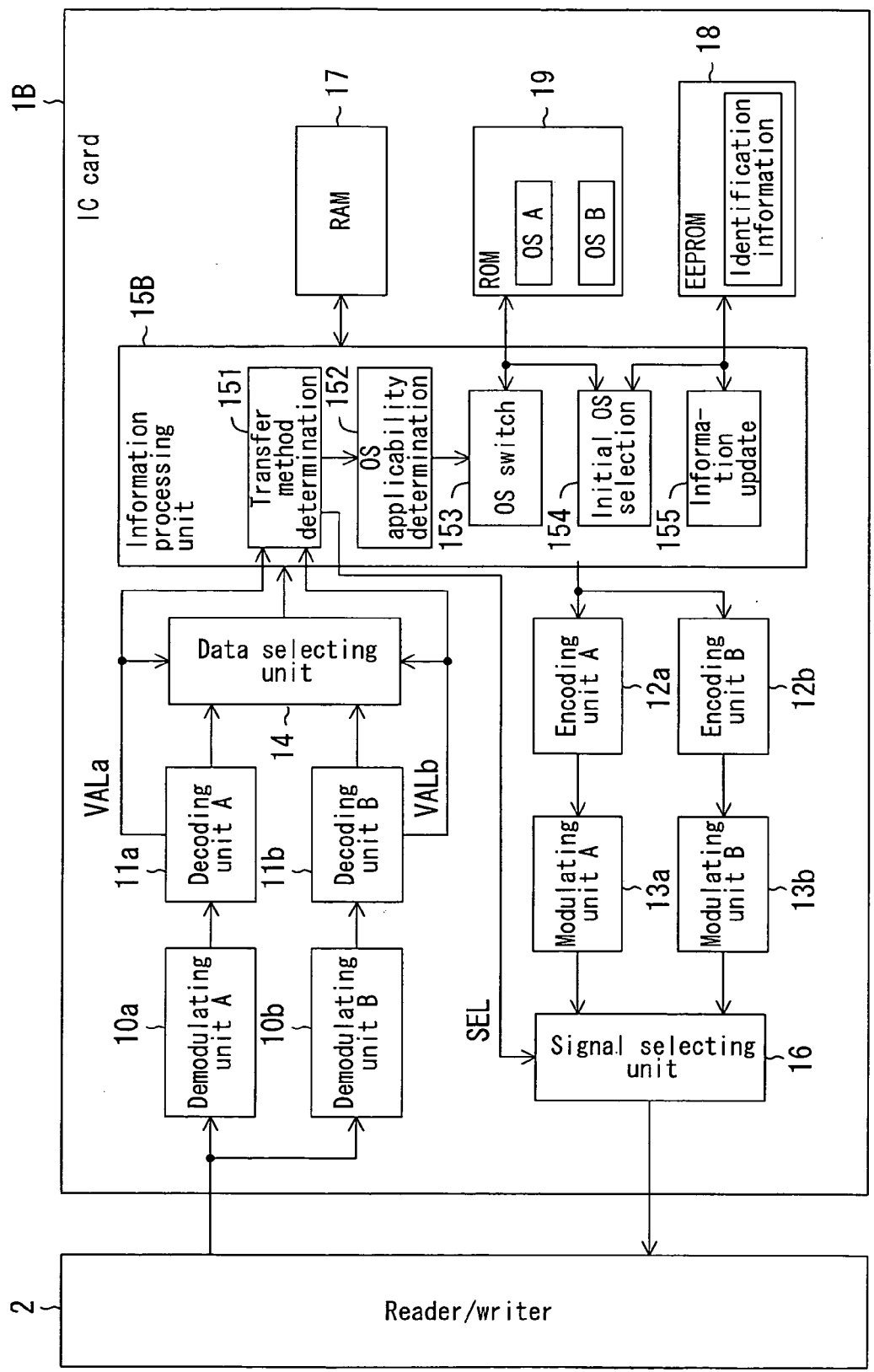
FIG. 7 is a functional block diagram of an IC card system composed of an IC card according to Embodiment 2 of the invention and an external device.

FIG. 7 is a functional block diagram of an IC card system composed of an IC card according to Embodiment 2 of the invention and an external device. The IC card 1B of this embodiment is different in the architecture from the IC card 1A of Embodiment 1 in an information processing unit 15B having an information update module 155 for updating identification information stored in a nonvolatile memory 18. The information update module 155 can be executed by using hardware or through program processing similarly to the other modules included in the information processing unit 15B.

Also, differently from the IC card 1A of Embodiment 1 in which static information of previously determined values such as standard values is used as the identification information, the IC card 1B of this embodiment uses, as the identification information, dynamic information of values varied depending upon the use condition of the IC card, and hence, the OS activation processing is different.

Figure 8:
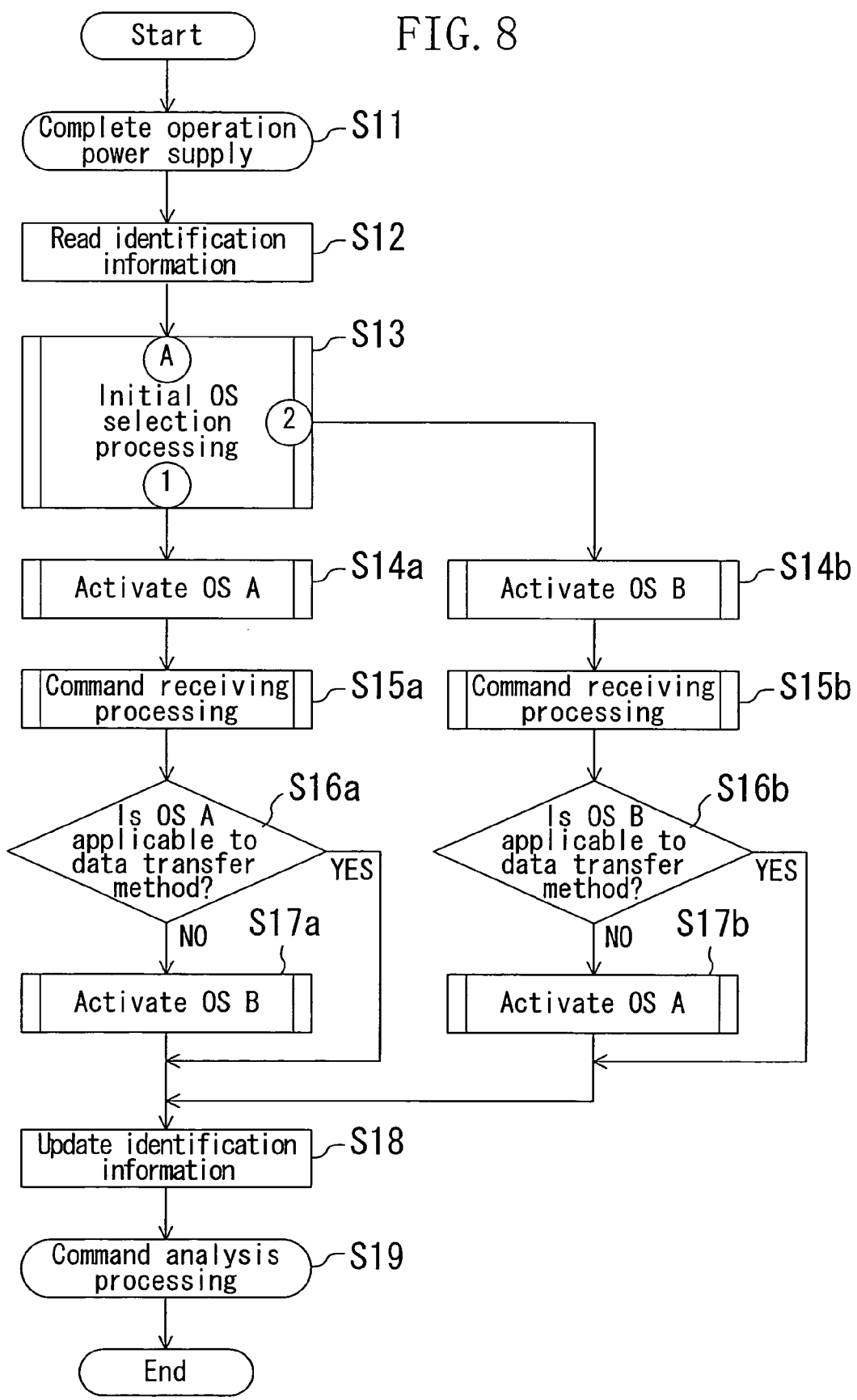
FIG. 8 is a flowchart of OS activation processing performed by the IC card of Embodiment 2 of the invention.

FIG. 8 shows an OS activation processing flow for the IC card 1B of this embodiment. In the flowchart of FIG. 8, update processing for the identification information (i.e., step S18) is inserted immediately before the command analysis processing (i.e., step S19) of the flowchart of FIG. 2. In other words, in the IC card 1B, the identification information is updated after determining which of the OS A and the OS B is applicable to the data transfer method.

Next, the initial OS selection performed in the IC card 1B of this embodiment will be explained by describing some specific examples.

FIRST EXAMPLE OF INITIAL OS SELECTION

In the first example of the initial OS selection, information about activation frequencies of the OS A and the OS B is used as the identification information. The activation frequency can be, for example, the number of times of selection/activation as the appropriate OS in a predetermined number of uses of the IC card 1B in the past, or a value obtained by weighting the number of times of activation for laying stress on the recent actual use conditions.

Figure 9:
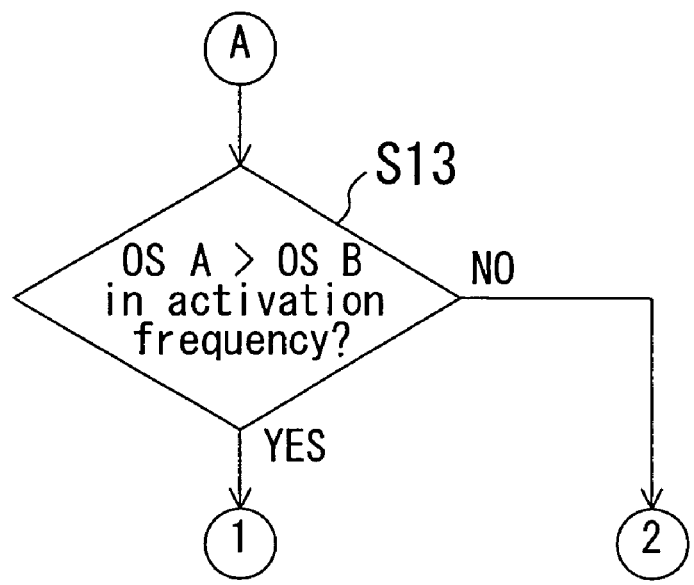
FIG. 9 is a chart of a first specific example of initial OS selection processing of FIG. 8.

FIG. 9 shows the initial OS selection processing (performed in step S13) of FIG. 8 corresponding to this example.

In step S13, the activation frequencies of the OS A and the OS B are compared with each other. When the activation frequency of the OS A is determined to be larger (namely, YES in step S13), the OS A is activated, and when the activation frequency of the OS B is determined to be larger (namely, NO in step S13), the OS B is activated.

Then, in the update processing of the identification information (performed in step S18) of FIG. 8, in the identification information stored in the nonvolatile memory 18 such as the information about the numbers of the activations of the respective OSs up to the previous use, the identification information of the OS corresponding to the data transfer method of the received command is incremented.

At this point, when the incremented value overflows, for example, the order of the number of activations of each OS attained before the increment is changed to an initial value using the minimum value of the number of activations. In this embodiment, since the number of OSs included in the IC card 1B is two, the number of activations of an OS with a larger number of activations is initialized to "2" and the number of activations of another OS with a smaller number of activations is initialized to "1".

Through this initial OS selection, an OS that is more frequently activated is selected and activated priorly. Thus, the response time to an initial command is expected to reduce. In particular, in the case where a data transfer method corresponding to one OS is mainly employed in the actual use, the response time is efficiently reduced.

SECOND EXAMPLE OF INITIAL OS SELECTION

In the second example of the initial OS selection, information about activation histories of the OS A and the OS B are used as the identification information. As the activation history, for example, the identification information of an OS that was immediately previously activated as an appropriate OS corresponding to the data transfer method is set to "1" and the identification information of another OS is set to "0".

Figure 10:
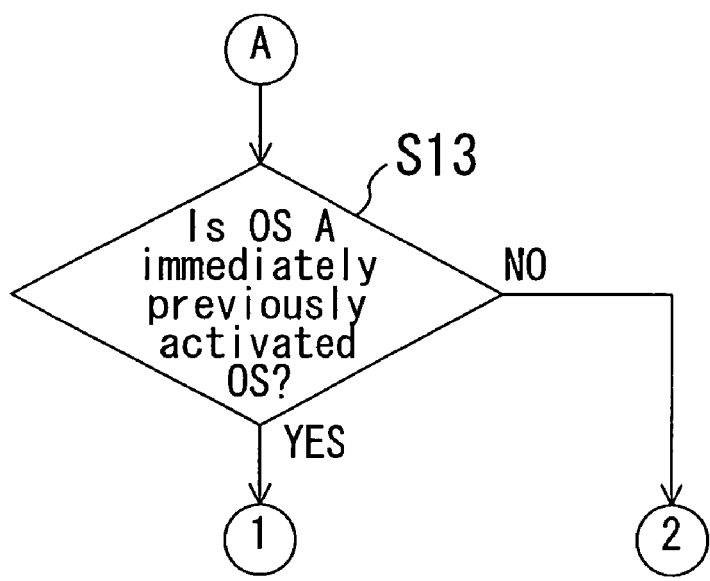
FIG. 10 is a chart of a second specific example of the initial OS selection processing of FIG. 8.

FIG. 10 shows the initial OS selection processing (performed in step S13) of FIG. 8 corresponding to this example. In step S13, the activation histories of the OS A and the OS B are referred. When a previously activated OS is determined to be the OS A (namely, YES in step S13), the OS A is activated, and when a previously activated OS is determined to be the OS B (namely, NO in step S13), the OS B is activated.

Then, in the update processing for the identification information (performed in step S18) of FIG. 8, in the identification information stored in the nonvolatile memory 18, the identification information of the OS corresponding to the data transfer method of the received command is updated to "1" and the identification information of the other OS is updated to "0".

Through this initial OS selection, an OS immediately previously activated is selected and activated priorly. Thus, the response time to an initial command is reduced. In particular, in the case where a data transfer method corresponding to one OS is mainly employed in the actual use, the response time is efficiently reduced.

As described so far, according to this embodiment, an initial OS is selected and activated on the basis of the dynamic information used as the identification information. In this manner, the OS activation processing is appropriately executed in accordance with the actual use condition of the IC card.

Embodiment 3

Figure 11:
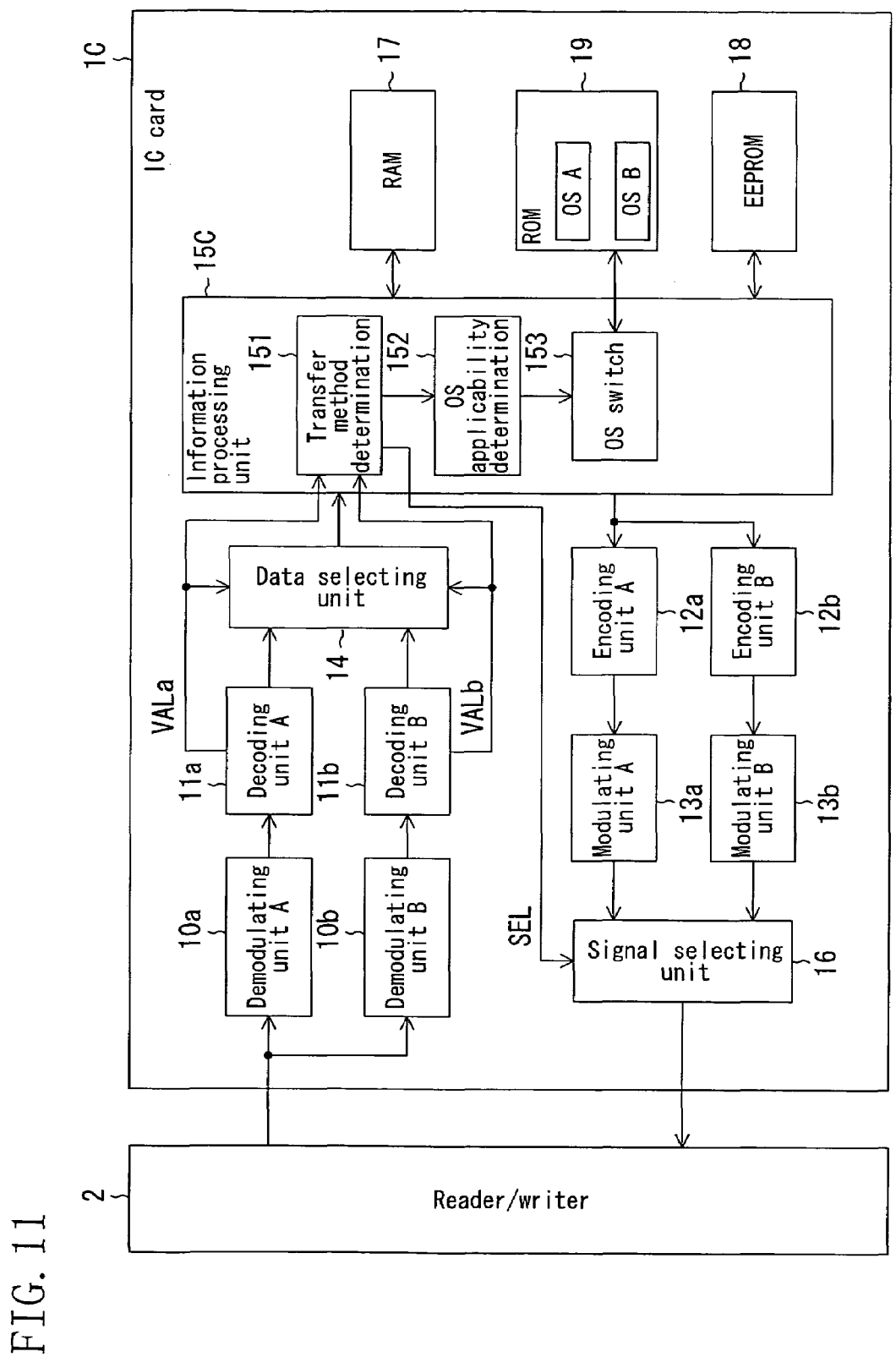
FIG. 11 is a functional block diagram of an IC card system composed of an IC card according to Embodiment 3 of the invention and an external device.

FIG. 11 is a functional block diagram of an IC card system composed of an IC card according to Embodiment 3 of the invention and an external device. The IC card 1C of this embodiment is different in the architecture from the IC card 1A of Embodiment 1 in using neither the identification information nor the initial OS selection module 154.

In general, an IC card OS is stored during the fabrication of the IC card or during the fabrication of an LSI built in the IC card, and the kind of OS to be stored and the architecture of a circuit for determining a transfer method are uniquely determined at the time of storing the OS. Accordingly, static information for use in the selection of an initial OS is obtained in the fabrication of the IC card, and therefore, a preferable initial OS is previously set with respect to each IC card. The static information may be various data as described above. In consideration of this, the IC card 1C of this embodiment is previously set so that the OS A can be activated as the initial OS.

Figure 12:
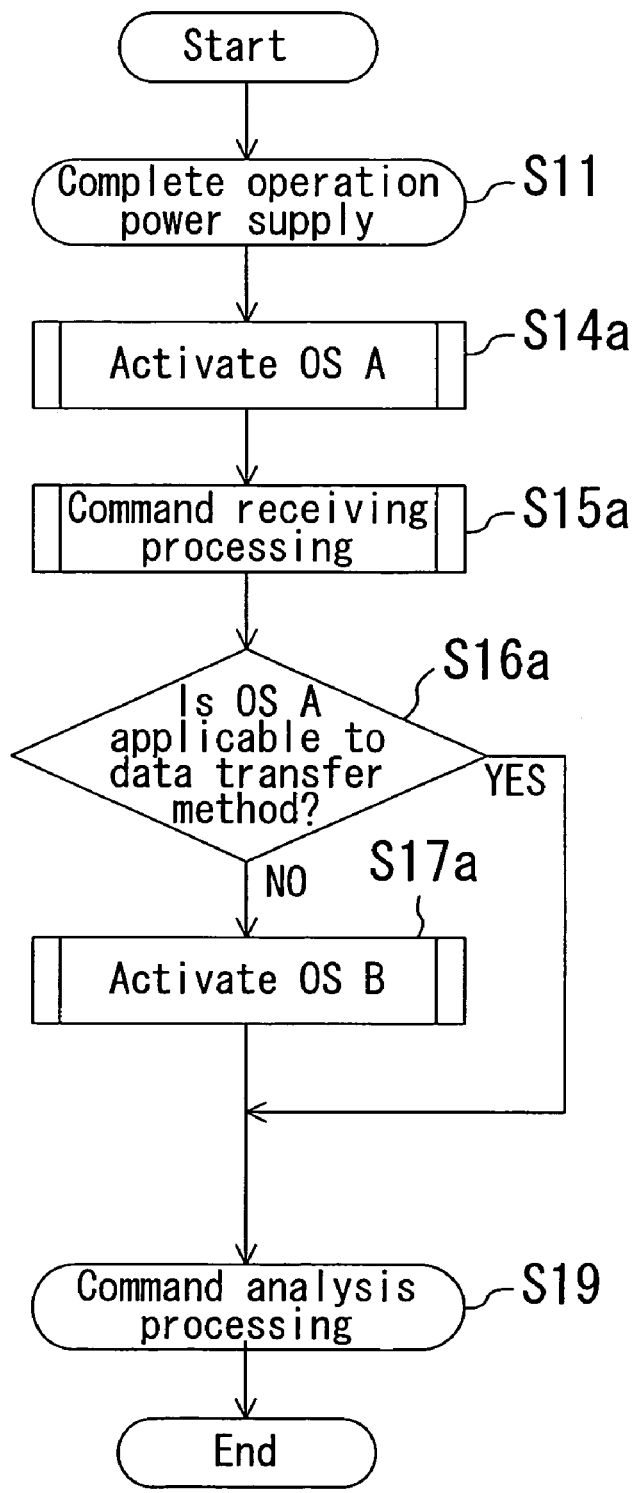
FIG. 12 is a flowchart of OS activation processing performed by the IC card of Embodiment 3 of the invention.

FIG. 12 shows an OS activation processing flow for the IC card 1C of this embodiment. The flowchart of FIG. 12 is obtained by omitting, in the flowchart of FIG. 2, the identification information read processing (i.e., step S12), the initial OS selection processing (i.e., step S13) and processing branched from step S13 (i.e., steps S14b through S17b).

According to this embodiment, when the power is supplied and the IC card iC starts its operation, the OS A is activated as the initial OS. Therefore, as compared with the conventional method in which it cannot be determined which OS is to be activated at the time of the power supply to the IC card and an appropriate OS is selected and activated after receiving an initial command from the reader/writer 2, the response processing to an initial command is more quickly executed. It goes without saying that the OS B can be set as the initial OS.

In each of Embodiments 1 through 3 described above, the numbers of kinds of data transfer methods and OSs are respectively two, which does not limit the invention. Three or more kinds of OSs can be stored in the ROM 19. Furthermore, when the number of each of the demodulating unit, the decoding unit, the encoding unit and the modulating unit together working as the data sending/receiving means is increased to three or more, an IC card applicable to three or more kinds of data transfer methods can be realized. It is noted that part of the data sending/receiving means can be shared between different data transfer methods.

The IC card of the present invention is suitably used as a contactless IC card in particular but is applicable also to a contact IC card.

As described above, according to the invention, in an IC card that is capable of data transfer by a plurality of data transfer methods and includes a plurality of OSs respectively corresponding to the plural data transfer methods, time spent on processing executed within the IC card is minimized in receiving data by any of the different data transfer methods. In particular, in the case where activation times of the respective OSs are largely varied or the "shift" between the demanded response time and the actually necessary response time is largely varied between the OSs, the maximum response time is reduced than in the conventional technique.

Alternatively, when an OS that is more frequently activated or that is immediately previously activated is selected as an initial OS, the response time to an initial command is reduced particularly in the case where one of the data transfer methods is extremely frequently used. Thus, an IC card capable of OS activation processing suitable to the actual use condition of the IC card by a user is realized.

What is claimed is:

1. An IC card capable of sending/receiving data by a plurality of data transfer methods and including a plurality of OSs respectively corresponding to said plurality of data transfer methods, comprising:
   transfer method determining means for determining, on the basis of externally received data, which of said plurality of data transfer methods is employed for data transfer with an external device;
   OS applicability determining means for determining whether or not a first data transfer method corresponding to a currently employed OS out of said plurality of data transfer methods accords with a second data transfer method determined by said transfer method determining means; and
   OS switching means for switching said currently employed OS to another OS out of said plurality of OSs when said OS applicability determining means determines that said first data transfer method does not accord with said second data transfer method,
   wherein one of said plurality of OSs is activated when power is supplied.

2. The IC card of claim 1, further comprising:
   a storage circuit for storing static information for use in selecting an initial OS to be activated when power is supplied to said IC card; and
   initial OS selecting means for selecting said initial OS from said plurality of OSs on the basis of said static information stored in said storage circuit,
   wherein said initial OS selected by said initial OS selecting means is activated when power is supplied.

3. The IC card of claim 2,
   wherein said storage circuit stores said plurality of OSs.

4. The IC card of claim 2,
   wherein said storage circuit stores, as said static information, information about response times demanded for in said plurality of data transfer methods respectively corresponding to said plurality of OSs, and
   said initial OS selecting means selects, as said initial OS, one of said plurality of OSs corresponding to a data transfer method in which said demanded response time is relatively short.

5. The IC card of any of claims 4,
   wherein each of said response times is a response time to an initial command involved in data transfer between said IC card and the external device.

6. The IC card of claim 2,
   wherein said storage circuit stores, as said static information, information about response times actually necessary in said plurality of data transfer methods respectively corresponding to said plurality of OSs, and
   said initial OS selecting means selects, as said initial OS, one of said plurality of OSs corresponding to a data transfer method in which said actually necessary response time is relatively long.

7. The IC card of any of claims 6,
   wherein each of said response times is a response time to an initial command involved in data transfer between said IC card and the external device.

8. The IC card of claim 2,
   wherein said storage circuit stores, as said static information, information about shifts between demanded response times and actually necessary response times in said plurality of transfer methods respectively corresponding to said plurality of OSs, and
   said initial OS selecting means selects, as said initial OS, one of said plurality of OSs corresponding to a data transfer method in which said shift is relatively large with said actually necessary response time longer than said demanded response time.

9. The IC card of any of claims 8,
   wherein each of said response times is a response time to an initial command involved in data transfer between said IC card and the external device.

10. The IC card of claim 2,
    wherein said storage circuit stores, as said static information, information about times respectively necessary for activating said plurality of OSs, and
    said initial OS selecting means selects, as said initial OS, one of said plurality of OSs that needs a relatively long time for activation.

11. The IC card of claim 2,
    wherein said storage circuit is a rewritable nonvolatile memory.

12. The IC card of claim 1, further comprising:
    a storage circuit for storing dynamic information for use in selecting an initial OS to be activated when power is supplied to said IC card;
    initial OS selecting means for selecting said initial OS from said plurality of OSs on the basis of said dynamic information stored in said storage circuit; and
    information updating means for updating said dynamic information stored in said storage circuit,
    wherein said initial OS selected by said initial OS selecting means is activated when power is supplied.

13. The IC card of claim 12,
    wherein said storage circuit stores, as said dynamic information, information about activation frequencies of said plurality of OSs, and
    said initial OS selecting means selects, as said initial OS, one of said plurality of OSs whose activation frequency is large.

14. The IC card of claim 12,
    wherein said storage circuit stores, as said dynamic information, information about activation histories of said plurality of OSs, and
    said initial OS selecting means selects, as said initial OS, one of said plurality of OSs that has been activated immediately previously.

15. The IC card of claim 12,
    wherein said storage circuit is a rewritable nonvolatile memory.

16. An OS activation method for an IC card capable of sending/receiving data by a plurality of data transfer methods and including a plurality of OSs respectively corresponding to said plurality of data transfer methods, comprising:
    an OS activating step of activating one of said plurality of OSs when power is supplied to said IC card;
    a transfer method determining step of determining, on the basis of an externally received data, which of said plurality of transfer methods is employed for data transfer with an external device;
    an OS applicability determining step of determining whether or not a first data transfer method out of said plurality of data transfer methods corresponding to said OS activated in the OS activating step accords with a second data transfer method determined in the transfer method determining step; and
    an OS switching step of switching said OS activated in the OS activating step to another OS out of said plurality of OSs when it is determined that said first data transfer method does not accord with said second data transfer method in the OS applicability determining step.

17. The OS activation method for an IC card of claim 16, wherein when power is supplied to said IC card, an initial OS to be activated in response to power supply to said IC card is selected from said plurality of OSs on the basis of static information for use in selecting said initial OS and said selected initial OS is activated in the OS activating step.

18. The OS activation method for an IC card of claim 16, wherein when power is supplied to said IC card, an initial OS to be activated in response to power supply to said IC card is selected from said plurality of OSs on the basis of dynamic information for use in selecting said initial OS and said selected initial OS is activated in the OS activating step, and said OS activation method further comprises an information updating step of updating said dynamic information.

* * * * *